United States Patent [19]

Chambliss

[11] Patent Number: 4,807,086

[45] Date of Patent: Feb. 21, 1989

[54] STATIC DISCHARGER FOR REFRIGERATOR EXTERNAL ACTUATOR LEVER

[75] Inventor: Patricia C. Chambliss, Perry Township, Vanderburgh County, Ind.

[73] Assignee: Whirlpool Corporation, Benton Harbor, Mich.

[21] Appl. No.: 69,648

[22] Filed: Jul. 6, 1987

[51] Int. Cl.[4] .............................................. H02H 3/22

[52] U.S. Cl. .................................. 361/212; 361/220; 62/127

[58] Field of Search ............... 361/212, 216, 220, 215; 62/127, 344

[56] References Cited

U.S. PATENT DOCUMENTS

| | | | |
|---|---|---|---|
| 3,386,001 | 5/1968 | Slossberg et al. | 361/220 |
| 4,102,660 | 7/1978 | Beckett et al. | 62/344 |
| 4,387,578 | 6/1983 | Paddock | 62/127 |
| 4,404,813 | 9/1983 | Paddock et al. | 62/127 |
| 4,646,528 | 3/1987 | Marcade et al. | 62/127 |

*Primary Examiner*—L. T. Hix
*Assistant Examiner*—David M. Gray
*Attorney, Agent, or Firm*—Mason, Kolehmainen, Rathburn & Wyss

[57] ABSTRACT

An external ice and/or water dispenser on the exterior of a freezer compartment door of a refrigerator includes a static electricity discharger formed by partially chrome plated ice and water actuator levers for actuating the dispensing of either ice or water and an at least partially conductive bearing for pivotally mounting the ice and water actuator levers. The bearing is made of an insulating material with a carbon filler. The discharger also includes a grounding wire coupled to the conductive bearing and extends to an electrical ground, such as the grounded frame of refrigerator door. Consequently, any static electric charges transferred to the actuator levers are discharged to ground to prevent damage to or destruction of sensitive electrical components of the refrigerator.

9 Claims, 2 Drawing Sheets

STATIC DISCHARGER FOR REFRIGERATOR EXTERNAL ACTUATOR LEVER

BACKGROUND OF THE INVENTION

A. Field of the Invention

The present invention generally relates to refrigerators having an external ice and/or water dispenser, and more particularly, to a discharger for discharging or dissipating to ground potential any static electric charges that may be transferred to ice and water actuator levers forming a part of the refrigerator external ice and/or water dispenser.

B. Description of the Prior Art

A conventional refrigerator may include an external service area for dispensing ice and/or water from the inside of the refrigerator through the door of the refrigerator. U.S. Pat. No. 4,102,660, assigned to the assignee of the present invention, discloses a refrigerator with such an external service area. Many such refrigerators having an external service area also have sensing and display systems to monitor conditions within different areas of the refrigerator and to display information concerning those conditions. For example, information concerning the temperature within the different areas of the refrigerator may be visually indicated at a display area located on the door of the refrigerator adjacent to the external service area. These sensing and display systems may utilize a microprocessor and other electronic components. One such type of sensing,. and display system is disclosed in U.S. Pat. No. 4,387,578.

In order to control the dispensing of such ice and/or water, actuator levers are pivotally mounted in the external service area. Upon depression of the appropriate lever, the lever is pivoted and water or ice is dispensed into a receptacle. In the above mentioned U.S. Pat. No. 4,102,660, these levers are shown to be supported by bearings permitting the levers to be pivoted, and thereby actuated, when a force is applied to the lever. In many refrigerators, some portions of the actuator levers are chrome plated. As a result, static electric charges that are generated from a person walking across a carpet or the like may be transferred to one of those levers when the lever is touched by the person or when the person comes sufficiently close to the lever that the built up static charge jumps the air gap between the person and the lever. Consequently, the static charge may be carried to the electronic components used in the refrigerator sensing and display system, damaging the components or erasing information stored in the memory of the microprocessor.

SUMMARY OF THE INVENTION

Accordingly, an object of the present invention is to provide a new and improved discharger for static electric charges which might be transferred to ice and/or water actuator levers included in a refrigerator external ice and water dispenser.

Another object of the present invention is to provide a new and improved bearing for pivotally mounting ice and water actuator levers used in a refrigerator external ice and/or water dispenser so that static electric charges are discharged to ground potential and do not detrimentally affect electronic circuits including microprocessors used in a refrigerator sensing and display system.

Another object of the present invention is to provide a new and improved static electric discharger which carries to ground potential static electric charges transferred to levers used in a refrigerator external service area.

In accordance with these and other objects of the present invention, an embodiment of the present invention includes a plastic bearing for pivotally mounting conductively coated ice and water actuator levers used for controlling the dispensing of ice or water at an external service area on the door of a refrigerator. While the bearing is primarily made of an insulating material, it is filled with a carbon filler so that the bearing is at least partially conductive. In one embodiment of the present invention, the bearing is made of acetal with a 5% by weight carbon filler. A grounding wire is coupled to the conductive bearing and extends to a suitable ground reference such as the grounded frame of the refrigerator door. Consequently, any static electric charges transferred to the actuator levers are discharged to ground through the conductive bearing.

BRIEF DESCRIPTION OF THE DRAWING

Other objects, advantages and novel features of the present invention will become apparent in considering the following detailed description in conjunction with he drawing in which.

DESCRIPTION OF THE PREFERRED EMBODIMENT

Figure 1:
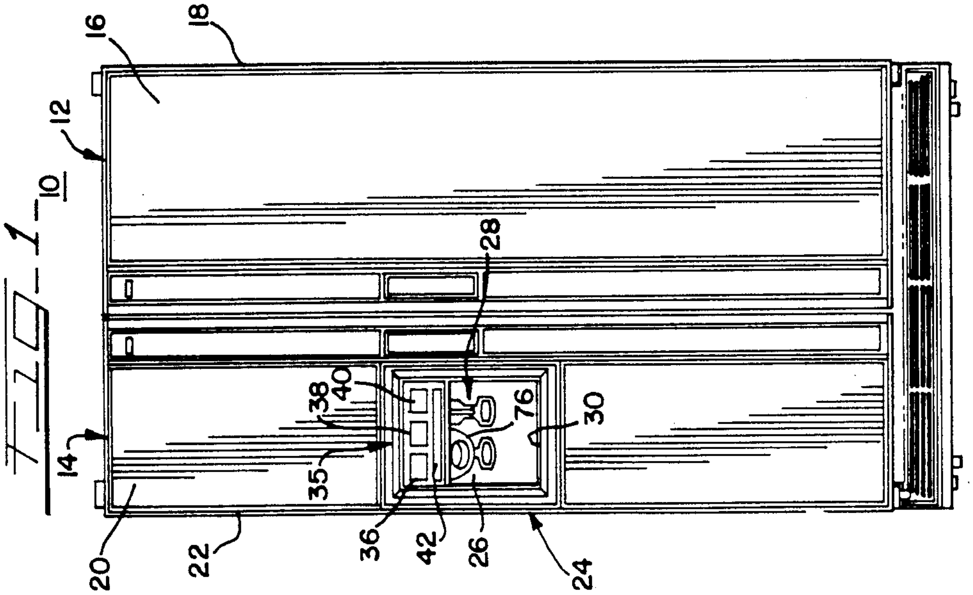
FIG. 1 is a front, elevational view of a refrigerator having an ice and water dispenser at an external service area and an information center area adjacent thereto on a door of the refrigerator.
Figure 3:
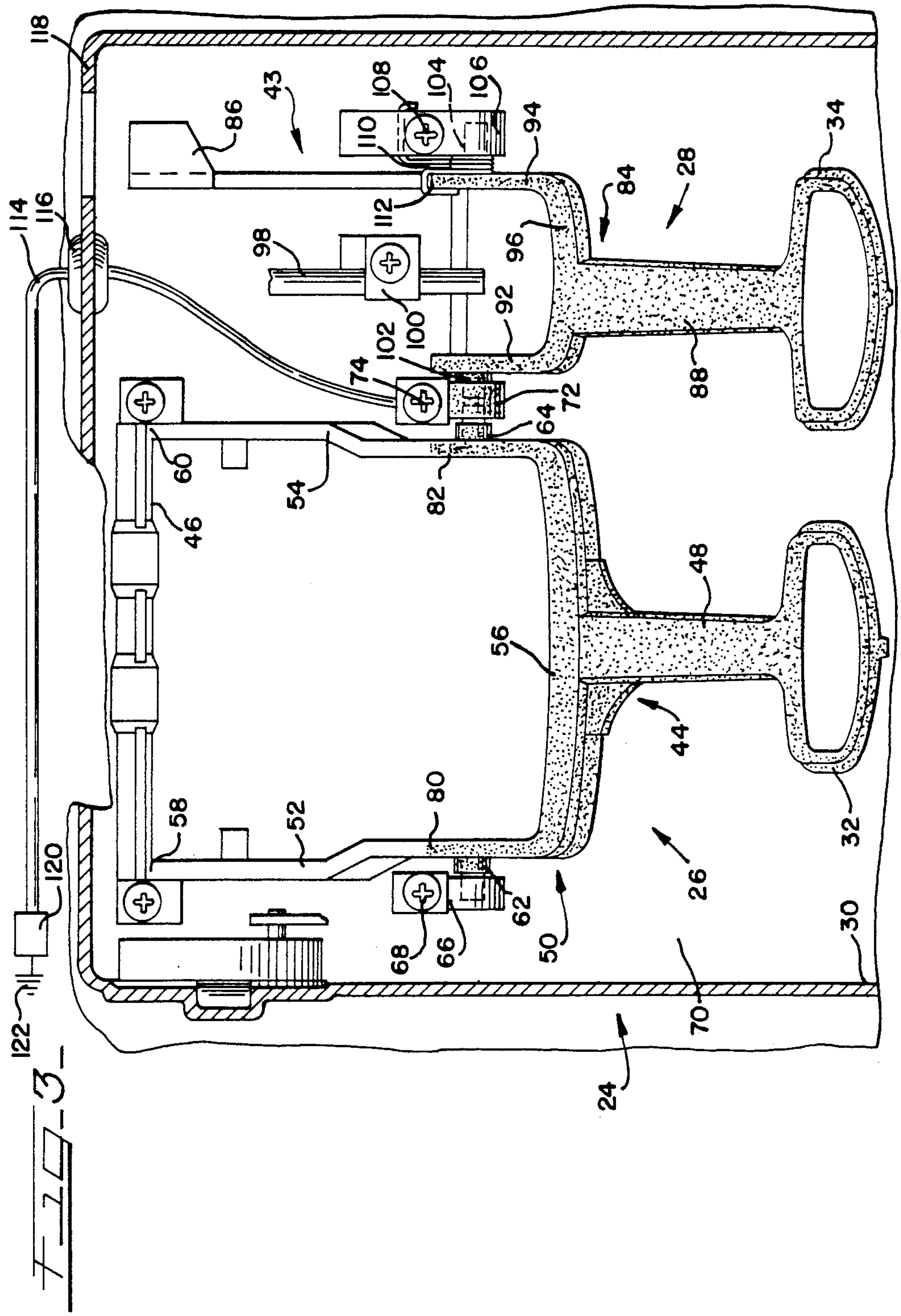
FIG. 3 is an enlarged, partially cross-sectional view, of the external service area of FIG. 2 illustrating the manner in which ice and water actuator levers of the external ice and water dispenser are mounted on the door of the refrigerator and coupled to ground potential.

Referring now more specifically to FIG. 1 of the drawing, therein is illustrated a side-by-side refrigerator 10 having a conventional fresh food refrigerator portion or compartment 12 and a freezer portion or compartment 14. A front door 16 is pivotally mounted along a side edge 18 of the refrigerator 10 and seals the compartment 12 when the door 16 is closed. In a similar manner, a front door 20 is pivotally mounted along an opposite edge 22 of the refrigerator 10 and seals the compartment 14 when the front door 20 is closed. The freezer front door 20 has an external ice and water service area 24 including an ice actuator lever 26 and a cold water actuator lever 28 disposed in a recess or cavity 30 in the outer or external side of the front door 14. Pieces of ice formed in a conventional ice maker (not shown) contained within the freezer compartment 14 are dispensed when a suitable receiving receptacle, such as a cup or a glass, is pressed against an enlarged pad 32 on the actuator 26. On the other hand, cold water is dispensed when a suitable receiving receptacle is pressed against an enlarged pad 34 on the actuator lever 28.

An information center area 35 is located on the door 20 just above the service area 24 and the actuator levers 26 and 28. The information center area 35 forms a part of a sensing and display system for the refrigerator 10 that provides visual displays of temperatures and other conditions within the refrigerator 10. Visual displays and touch actuated switches controlling such displays are disposed in areas 36, 38, 40 and 42 located within the information center area 35. The sensing and displaying of the information in the areas 36, 38, 40 and 42 is controlled by electronic components including microprocessors or the like. In many instances, these electronic components are disposed in the door 20 of the freezer compartment 14 in or around the information center area 35. In order to ensure that electronic components, such as the microprocessors, used in the refrigerator 10 for sensing and displaying the information are not damaged or detrimentally affected by static electric charges that may be transferred to the actuator levers 26 and 28, the refrigerator 10 includes a static electric discharger 43 for the levers 26 and 28.

The actuator lever 26 includes a yoke 44 connecting the pad 32 to a cross bar 46. The yoke 44 has a neck portion 48 extending between the pad 32 add a U-shaped pivot portion 50 having legs 52 and 54 interconnected by a bight portion 56. The neck portion 48 is connected to the mid-point of the bight portion 56. The cross bar 46 extends between distal ends 58 and 60 of the legs 52 and 54, respectively.

Figure 2:
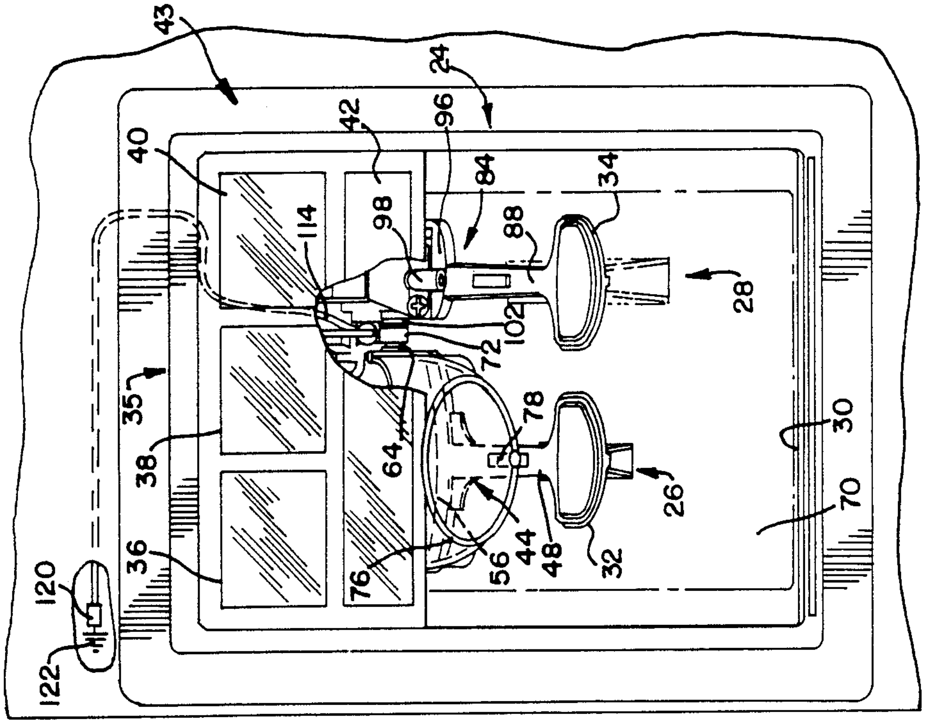
FIG. 2 is an enlarged, fragmentary partially cut-away view of the external service area of the refrigerator of FIG. 1 illustrating a static discharger embodying the present invention.

A pivot tab or journal 62 extends from the leg 52 at a point closer to the bight portion 56 than the distal end 58. In a similar fashion, a pivot tab or journal 64 extends from the leg 54 at a similar point closer to the bight portion 56 than the distal end 60 of the leg 54. The journal 62 extends into and is pivotally mounted in a bearing 66 secured by a suitable fastener 68 to a rear wall 70 of the cavity 30. Another bearing 72 is secured by a fastener 74 to the rear wall 70 adjacent the leg 54. The journal 64 extends into and is pivotally mounted in the bearing 72 and consequently is in contact with the bearing 72. Upon the application of an actuator force to the pad 32 (as, for example, when a glass is pressed against the pad 32), the pad 32 moves toward the rear wall 70 and the yoke 44 pivots about the journals 62 and 64 resulting in the movement of the cross bar 46 in an opposite direction away from the wall 70. When the cross bar 46 is so moved, an ice dispenser switch (not shown) will be actuated and ice pieces will be delivered through an ice guide 76 (FIG. 2) secured to te neck portion 48 of the lever 26 by a bracket 78. Consequently, the ice guide 76 will move along with the neck portion 48 of the lever 26 so that the ice pieces are delivered into the receptacle being pressed against the pad 32. Once the actuation force is no longer applied to the pad 32, the actuator lever 26 is returned to a normal position and no further ice pieces are dispensed because the cross bar 46 no longer actuates the ice dispenser switch.

A portion of the lever 26 including the enlarged pad 32, the neck portion 48, the bight portion 56, a portion of the leg 52 extending from the bight portion 56 to a point 80 slightly beyond the journal 62, a portion of the leg 54 extending from the bight portion 56 to a point 82 slightly beyond the journal 64 and the journals 62 and 64 are chrome plated. Accordingly, at least these portions of the actuator lever 26 are conductive.

Like the ice piece actuator lever 26, the water actuator lever 28 is disposed in the recess 30 of the external service area 24 along side of the actuator lever 28. The lever 28 includes a somewhat smaller yoke 84 extending between the pad 34 and an actuator arm 86. The yoke 84 has a neck portion 88 connecting the enlarged actuator pad 34 and a Ushaped pivot portion 90 having opposed legs 92 and 94 interconnected by a bight portion 96. The neck portion 88 is connected to the bight portion 96 at a location offset from the mid-point of the bight portion 96. The actuating arm 86 is an extension of the leg 94 and controls the dispensing of refrigerated water from the refrigerator 10 through a delivery tube 98 held in position relative to the rear wall 70 by a tube bracket 100.

A pivot tab or journal 102 extends outwardly from the leg 92 and extends into and is pivotally mounted in the bearing 72 located between the leg 54 of the actuator lever 26 and the leg 92 of the actuator lever 28. Consequently, the journal 102 is in contact with the bearing 72. A pivot tab or journal 104 extends outwardly from the other leg 94 and is pivotally mounted in a bearing 106 secured by a fastener 108 to the rear wall 70 of the recess 30. Upon the application of an actuator force to the pad 34 (as, for example, when a glass is pressed against the pad 34), the pad 34 moves toward the rear wall 70. The yoke 84 pivots about the journals 102 and 104 disposed in the bearings 72 and 106, respectively, resulting in the movement of the actuating arm 86 in an opposite direction away from the rear wall 70. When the actuator arm 86 is so moved, a water dispensing switch (not shown) will be actuated and refrigerated water will be delivered through the delivery tube 98 into the receptacle being pressed against the pad 34. Once the actuating force is removed from the pad 34, a spring 110 wrapped around the journal 104 and attached between the arm 94 and the rear wall 70 by the fastener 108 returns the actuator lever 28 to its normal position so that no further water is dispensed through the tube 98 because the water dispensing switch is no longer actuated.

As was the case with respect to the actuator lever 26, a portion of the actuator lever 28 is chrome plated. For example, the actuator pad 34, the neck portion 88, the bight portion 96, the leg 92, a portion of the leg 94 extending from the bight portion 96 to a point 112 slightly beyond the journal 104 and the journals 102 and 104 are chrome plated.

In view of the fact that portions of the actuator levers 26 and 28 are conductive, static electric charges that may be generated from a person walking across carpets may be transferred to one or both of the levers 26 and 28 when the lever 26 or 28 is touched by the person or when the person comes sufficiently close to the lever 26 or 28 that the static electric charge jumps the air gap between the person and the lever 26 or 28.

In order to prevent the static electric charges transferred to the actuator levers 26 and 28 from being carried to and detrimentally affecting any electronic components used in connection with the information center 35, the bearing 72 located between the leg 54 of the lever 26 and the leg 92 of the lever 28 is made of a material that is at least partially electrically conductive. Consequently, any static electric charges transferred to the lever 26 or the lever 28 are coupled through the journal 64 in the case of the lever 26 and the journal 102 in the case of the lever 28 through the bearing 72 to a grounding wire 114 coupled to the bearing 72. The grounding wire 114 is secured to the bearing 72 by the same fastener 74 that secures the bearing 72 to the wall 70 and extends through a grommet 116 in a wall 118 of the freezer compartment door 20. The grounding wire 114 is coupled to a tab 120 which in turn is coupled to the grounded metal frame of the freezer door 20, schematically represented as an electrical ground 122. The ground 122 may be coupled to earth ground through the grounded prong of the power plug (not shown) of the refrigerator 10.

The bearings 66, 72 and 106 all are made of a plastic material, such as acetal. By adding a carbon filler to the bearing 72, the bearing 72 is made conductive. If the acetal material from which the bearing 72 is made has about a 5% by weight carbon filler, the bearing 72 is sufficiently conductive for the purpose of carrying such static electric charges to the grounding wire 114. However, the bearing 72 can be made, if desired, with a greater percentage of carbon filler, for example, a 10% by weight carbon filled acetal material could be used.

Obviously, many modifications and variations of the present invention are possible in light of the above teachings. Thus, it is to be understood that, within the scope of the appended claims, the invention may be practiced otherwise than as specifically described hereinabove.

What is claimed and is desired to be secured by Letters Patent is:

1. A refrigeration device comprising
an external door,
dispensing means disposed in said door for dispensing pieces of ice and/or water, said dispensing means including pivotally mounted actuating means for dispensing said pieces of ice and/or water,
electronic means disposed in said door adjacent said dispensing means and
means for electrically grounding said actuating means thereby to direct static electric charges to an electrical ground and for electrically projecting said electronic means from overvoltage conditions resulting from static electric charges, said grounding means comprising an at least partially electrically conductive bearing disposed adjacent said actuating means for pivotally mounting said actuating means relative to said door and conductive means for electrically connecting said bearing to an electrical ground, said bearing being made of an insulating material having a conductive filler.

2. A refrigeration device as recited in claim 1 wherein said bearing is made of acetal with at least approximately 5% by weight of a carbon filler.

3. A refrigeration device as recited in claim 1 wherein said conductive means includes a conductive wire coupled to said bearing and to a grounded portion of said door.

4. A refrigeration device as recited in claim 1 wherein said actuating means is at least partially electrically conductive.

5. A refrigerator comprising
a grounded frame member,
an external service area disposed in an external door for dispensing pieces of ice and/or water,
electronic means disposed in said door adjacent said external service area,
first means in said external service area for controlling the dispensing of said pieces of ice,
second means in said external service area for controlling the dispensing of said water,
a first journal extending from said first means,
a second journal extending from said second means,
conductive means on said first and second means for rendering conductive at least portions of said first and second means and said first and second journals,
a bearing disposed adjacent to said first and second means and adapted to receive said first and second journals to pivotally mount said first and second means in said external service area, said bearing being made of an at least partially conductive material, and
conductor means for electrically connecting said bearing to said grounded frame member and for protecting said electronic means from overvoltage conditions resulting from static electric charges.

6. A refrigerator as recited in claim 5 wherein said bearing is made of an insulating material having a carbon filler.

7. A refrigerator as recited in claim 6 wherein said bearing is made of acetal with at least approximately 5% by weight of a carbon filler.

8. A refrigerator as recited in claim 5 wherein said conductive means is chrome plating covering at least portions of said first and second means and said first and second journals.

9. A refrigerator as recited in claim 5 wherein said bearing is mounted between said first and second means.

* * * * *